Sept. 16, 1947.  L. H. STOCK ET AL  2,427,633
DOUBLE HOLE LEVER CAN PUNCHER
Filed Sept. 6, 1944

INVENTORS
Lewis H Stock &
George J. Stock

Carl Miller
ATTORNEY

Patented Sept. 16, 1947

2,427,633

UNITED STATES PATENT OFFICE 2,427,633

DOUBLE HOLE LEVER CAN PUNCHER

Lewis H. Stock and George J. Stock,
Passaic, N. J.

Application September 6, 1944, Serial No. 552,832

4 Claims. (Cl. 30—16)

This invention relates to a device for simultaneously punching two holes in standard condensed or evaporated milk, vegetable and fruit juice cans, edible oil cans, and food containers from which the contents are poured by using one hole for discharge and one hole, located on the opposite side of the can or container, for the admission of air to replace the contents which have been discharged.

One of the objects of the invention is to provide a device of this kind, which can be used for simultaneously punching two holes in certain sized food cans, and which may be adjusted so that smaller sized cans may be punched, one hole at a time.

A further object of the invention is the provision of a device of this character with a pair of posts, between which the can to be punched is placed, a platform adjustable on these posts, and a lever pivoted to swing on the posts and provided with independent piercing elements, so arranged that they may be forced into a food can when the latter is properly positioned under the lever, and two pouring holes formed in the food can.

With the above and other objects in view the invention consists in certain new and useful constructions, combinations and arrangements of parts, clearly described in the following specification and fully illustrated in the drawings, in which.

Figure 4:
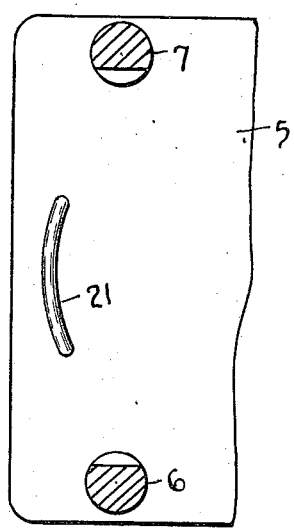
Fig. 4 is a similar view, taken on line 4—4 of Fig. 2, looking in the direction of the arrows.

Referring to the accompanying drawings, which illustrate the practical embodiment of the invention, 5 designates a metal base and 6 and 7 the posts or supports which have their lower ends fixed to the base.

To the upper ends of the posts or supports 6 and 7 the cross bar 8 is pivotally connected, as by the pin 9, and to this cross bar 8 the lever 10 is fixed, as by welding, and this lever is provided with a handle 11.

The cross bar 8 is equipped with two conical and sharp pointed points or piercing elements 12 and 13, which are spaced apart a distance corresponding to the inside dimensions of the most commonly used food cans. These piercing elements project from the underside of the bar 8, and are located on this bar close to the pivot pin 9, while the lever 10 has a length many times the distance between the points and the pivot pin.

Milk and juice cans vary in height, and in order to adapt our improved punching tool to all cans having less height than the most popular food cans, we form slots 14 and 15 in the posts 6 and 7, to provide pairs of horizontal seats for the adjustable platform or bar 16.

Figure 1:
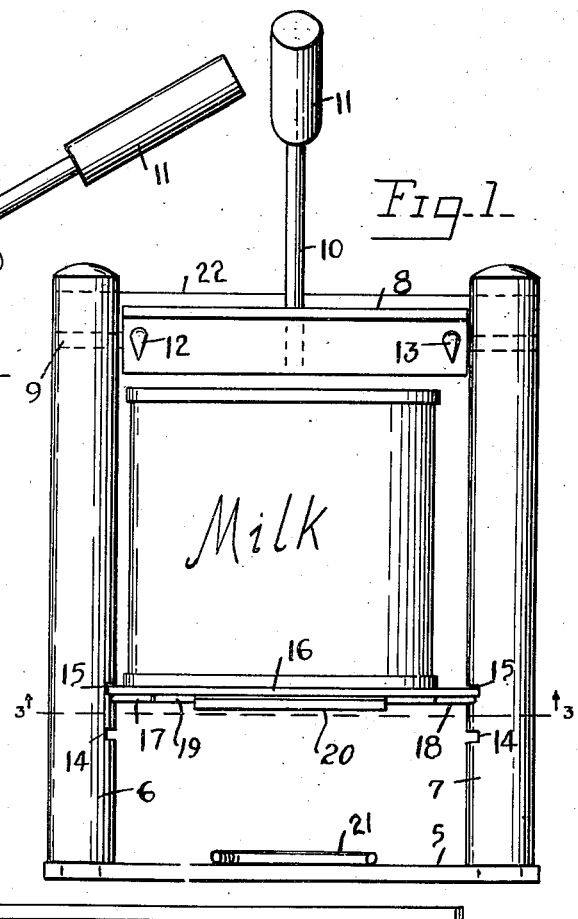
Fig. 1 is a front elevation of the device, showing the adjustable platform in a raised position, and a milk can thereon.
Figure 2:
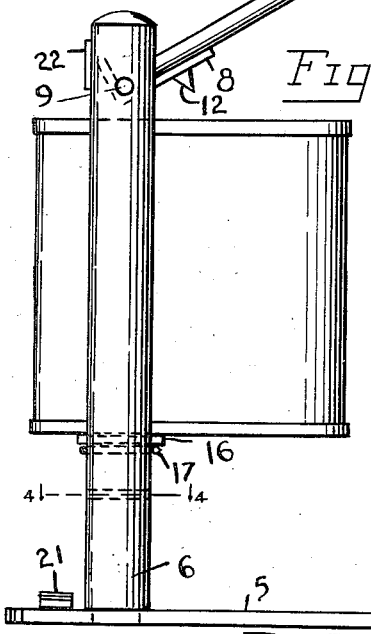
Fig. 2 is a side view thereof.
Figure 3:
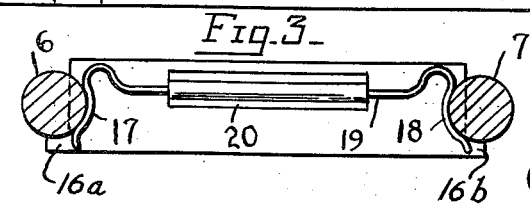
Fig. 3 is a detail cross sectional view, taken on line 3—3 of Fig. 2, looking in the direction of the arrows.

This bar or platform 16 is provided with stops 16a and 16b, designed to engage the sides of the posts when the end edges of said bar or platform are in the slots in the same horizontal plane, as shown in Figs. 1, 2 and 3.

In order to prevent accidental displacement of the bar or platform 16 from the horizontal seats or slots of the posts 6 and 7, we provide this bar or platform with spring loops 17 and 18, formed on the bar or wire stock 19, and this may be welded directly to the underside of the bar or platform 16, or attached by means of the metal clip 20, shown in Fig. 3, and this clip welded to the bar.

The spring loops are designed to snap on the circular posts and retain the bar or platform against accidental displacement.

In the drawings we show three stages of adjustment or support for the can, one directly on the base 5, one on the platform or bar 16, in the uppermost position it is shown in, and one below this position, in the horizontal seats or slots, which last adjustment is made by shifting the bar 16 from the upper position to the intermediate position.

It is understood that any additional horizontal slots or seats that may be required to meet different sizes of food cans used, may be employed, without departing from the spirit of the invention, as defined in the claims hereof.

When it is desired to punch holes in the smaller sized milk or food can, the platform or bar 16 is positioned as shown in Fig. 2, and the lever is depressed, so that one of the piercing points or elements will be forced into the top of the can, near the outer edge thereof. The can is then shifted on the bar or platform, and the lever again depressed, so as to force the other point or piercing element into the can top, on the opposite side of the can.

When it is desired to punch the larger food can, the bottom of the can is positioned on the base 5 and the bar or platform 16 is not used. The lever is then depressed so that both points or piercing elements will penetrate the can top.

The base is provided with a stop 21, which limits the movement of the can placed thereon. The distance between the posts is great enough to receive the largest of the milk cans in common use. The upper ends of the posts are secured together against outward displacement, by means of the cross bar 22, which also serves as a stop to limit the rearward movement of the lever.

It is understood that various changes may be made in the materials and in the details of construction, without departing from the scope and spirit of the invention, as defined in the claims hereof.

Having described our invention we claim as new:

1. A food can puncher consisting of a base, a pair of posts mounted on the base in parallel relation to each other, a lever having a cross bar pivoted between the upper ends of the posts, said cross bar having punching elements on the underside thereof, a bar connecting the upper ends of the posts to each other and providing a stop for limiting the rearward swinging motion of the lever, said posts each having a plurality of horizontal seats, the seats on one post being disposed in different planes and respectively opposed to the seats on the other post and a platform bar slidable on the opposed seats and provided with a spring loop to engage the side of each post.

2. A food can puncher consisting of a base, posts thereon, a lever having a cross bar pivoted between the posts and provided with can punching elements, each post having a plurality of horizontal slots, certain of the slots being disposed in common horizontal planes, a platform bar slidable in the slots in the same horizontal plane, a spring wire on the platform, and spring loops on the ends of the wire arranged to engage the sides of the posts to retain the platform bar against accidental displacement from the slots.

3. A food can punching device consisting of a base, posts secured at their lower ends to the base, a cross bar angle-shaped in cross-section pivoted to the posts, a lever extending from one of the legs of said angle-shaped cross bar, spaced piercing elements extending from said one of said legs, said posts having opposed horizontal seats, a bar adapted to engage the seats for supporting a can under the cross bar, and resilient means for preventing accidental displacement of the platform bar.

4. The device set forth in claim 3, having a fixed bar connecting the upper ends of said posts adjacent but spaced from said angle-shaped cross bar serving as a limit stop to the upward swinging of said lever by contact therewith of the other of the legs of said angle-shaped cross bar.

LEWIS H. STOCK.
GEORGE J. STOCK.

REFERENCES CITED

The following references are of record in the file of this patent:

UNITED STATES PATENTS

| Number | Name | Date |
| --- | --- | --- |
| 133,500 | Thomas | Nov. 26, 1872 |
| 640,732 | Baker | Jan. 9, 1900 |
| 2,037,410 | Ernst | Apr. 14, 1936 |
| 2,284,066 | Ostrander | May 26, 1942 |
| 479,011 | Morgon | July 19, 1892 |